G. L. RASTMAN.
MEAT HANGER.
APPLICATION FILED MAY 18, 1912.
1,058,387.
Patented Apr. 8, 1913.
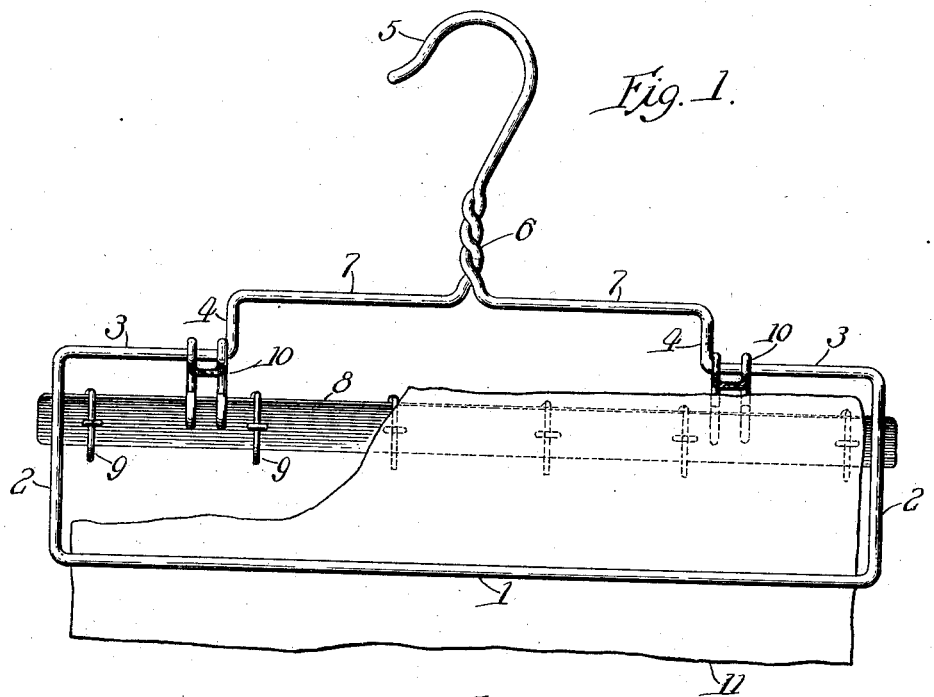
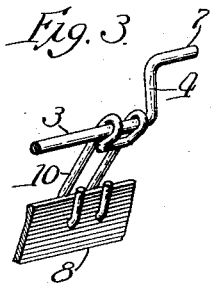
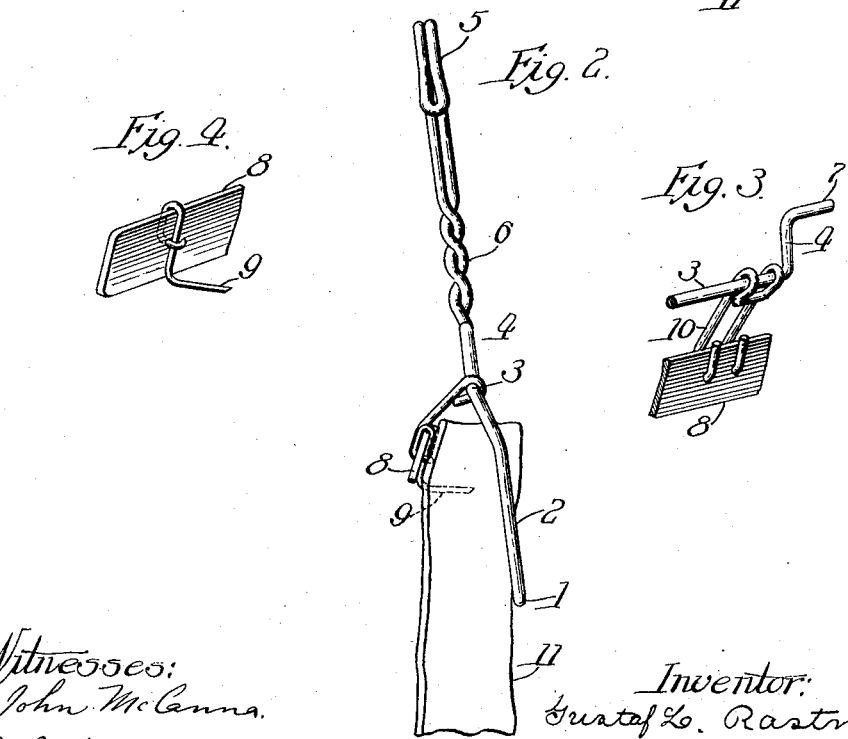
Witnesses:
John McKenna.
E. Behel.
Inventor:
Gustaf L. Rastman
By A. O. Behel
Atty.

UNITED STATES PATENT OFFICE.

GUSTAF L. RASTMAN, OF ROCKFORD, ILLINOIS.

MEAT-HANGER.

1,058,387.  Specification of Letters Patent.  Patented Apr. 8, 1913.

Application filed May 18, 1912.  Serial No. 698,324.

*To all whom it may concern:*

Be it known that I, GUSTAF L. RASTMAN, a citizen of the United States, residing at Rockford, in the county of Winnebago and the State of Illinois, have invented certain new and useful Improvements in Meat-Hangers, of which the following is a specification.

The object of this invention, is to construct a meat hanger in which the meat is supported by hooks entering one side of the meat and the meat held on the hooks by a bail.

In the accompanying drawings: Figure 1 is a front elevation. Fig. 2 is an edge elevation. Fig. 3 is a perspective view of one of the link connections between the hook support and bail. Fig. 4 is a perspective view of one of the hooks in connection with its support.

The bail or main support comprises the lower bar 1, end bars 2, sections 3 parallel with the lower bar 1, and from the inner ends of these sections 3 extend ends 4 parallel with the ends 2. The hook 5 is formed of the wire forming the bail having a twisted section 6 with its branches 7 connected with the ends 4.

A plate 8 supports a series of hooks 9 connected with the plate by passing through it and turned over one edge of the plate and bent over the main portion of the hook as shown at Fig. 4. This plate is supported from the sections 3 of the bail by the double ended links 10 hooked in connection with the sections 3 and passing through perforations in the plate 8. This plate 8 can swing in connection with the bail through the link connection.

In use, the hooks 9 are inserted through the rind of the bacon 11 and in hanging the bail up by the hook 5, the bacon will rest against the lower bar 1 of the bail, which will prevent the dropping of the bacon. The ends 4 hold the links 10 from a sliding movement on the sections 3 in order that the plate 8 may be located centrally of the length of the bail.

I claim as my invention:

1. A meat hanger comprising a bail formed with a hook and with stop projections, a plate provided with hooks, and links connecting the plate and bail and held against a shifting movement by the stop projections.

2. A meat hanger comprising a bail in loop form having stop projections, and a supporting hook, a plate provided with hooks pointing toward the bail, and links connecting the plate and bail and held against a shifting movement by the stop projections.

In testimony whereof I have hereunto set my hand in presence of two subscribing witnesses.

GUSTAF L. RASTMAN.

Witnesses:
A. O. BEHEL,
JOHN MCCANN.

Copies of this patent may be obtained for five cents each, by addressing the "Commissioner of Patents, Washington, D. C."